United States Patent [19]

Hoag

[11] Patent Number: 4,755,720
[45] Date of Patent: Jul. 5, 1988

[54] DISCHARGE ELECTRODE WITH CORROSION-PROOF STRUCTURE

[75] Inventor: Ethan D. Hoag, Boston, Mass.

[73] Assignee: Laser Corporation of America, Lowell, Mass.

[21] Appl. No.: 841,760

[22] Filed: Mar. 20, 1986

[51] Int. Cl.[4] .................... H01J 1/15; H01J 1/88; H01J 17/06
[52] U.S. Cl. .................................. 313/619; 313/631
[58] Field of Search ............ 313/340, 619, 631, 632, 313/332

[56] References Cited

U.S. PATENT DOCUMENTS 2,082,165  6/1937  Le Van ..................... 313/619 X
3,599,027  8/1971  Koshizuka et al. ......... 313/619 X

FOREIGN PATENT DOCUMENTS 908488  10/1962  United Kingdom ............ 313/619

Primary Examiner—David K. Moore
Assistant Examiner—K. Wieder
Attorney, Agent, or Firm—William W. Habelt

[57] ABSTRACT

A pin-shaped discharge electrode is provided which prevents corrosion and promotes stable glow discharge. In order to reduce the occurrence of a large field near the bottom of the electrode, the electrode is embedded in a cavity of an insulating base plate.

2 Claims, 2 Drawing Sheets

DISCHARGE ELECTRODE WITH CORROSION-PROOF STRUCTURE

BACKGROUND OF THE INVENTION

This invention relates to a structure of a discharge electrodes having pin-shaped electrodes, and more particularly to a structure of a discharge electrode in which the pin-shaped electrodes will not corrode and in which a stable glow discharge can be accomplished.

In the prior art, a discharge electrode is known with a structure having a large number of pin-shaped electrodes embedded in an insulating base plate.

For the purpose to obtaining homogeneous glow discharge, to render less resistance to gas flow, and further, to form a compact electric discharge electrode, generally, this pin-shaped electrode is constructed to be thin and to protrude from an insulating base place by a comparatively small amount.

However, in such case when a negative glow extends up to the contact portion between the pin-shaped electrode which is a conductor and the base plate which is an insulator, a large electric field occurs near the bottom of the pin-shaped electrode, and the pin-shaped electrode receives a strong electrochemical reaction near its bottom, and thus it has been observed that it is corroded near the bottom.

This corrosion gradually thins down the bottom of the pin-shaped electrode, and there are cases when it breaks the pin-shaped electrode near the bottom.

Also, in the conventional discharge electrode, since a large electric field is caused near the bottom of the pin-shaped electrode as described above, there is a tendency to transfer a glow discharge into an arcing discharge.

SUMMARY OF THE INVENTION

The object of this invention is to provide a discharge electrode in which pin-shaped electrodes will not corrode and in which a stable glow discharge can be accomplished.

In order to accomplish the above described object, in this invention, so that no large field will occur near the bottom of the pin-shaped electrode, said pin-shaped electrode has been embedded in a cavity of an insulating base plate.

DETAILED DESCRIPTION OF THE PREFERRED EMBODIMENTS OF THE INVENTION

Figure 1:
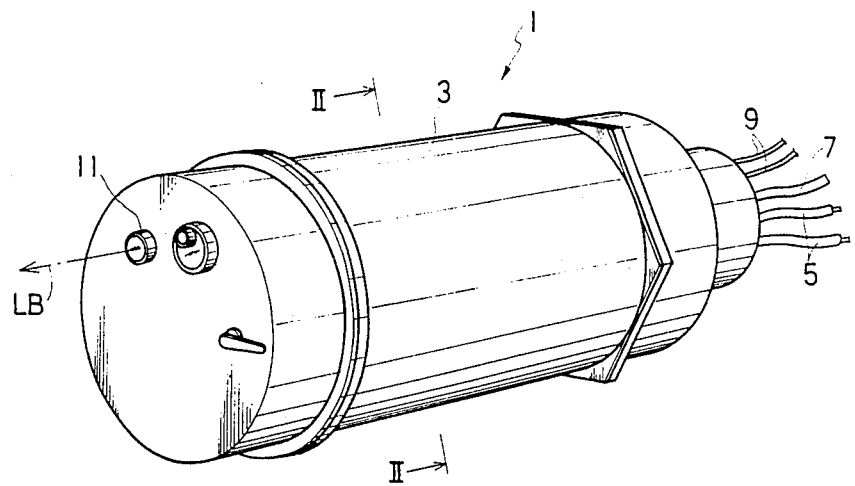
FIG. 1 is a perspective view of a laser oscillating apparatus.
Figure 2:
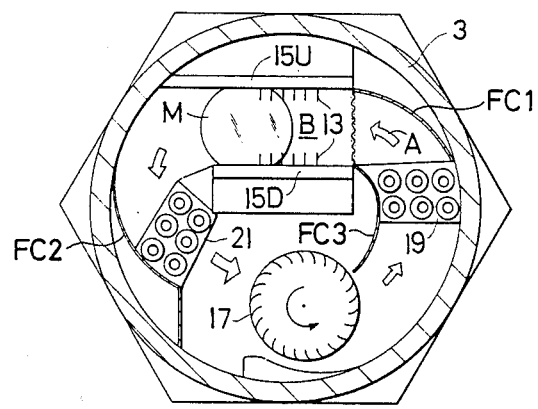
FIG. 2 is a cross-sectional view taken along the line II—II in FIG. 1.

FIG. 1 and FIG. 2 show a laser oscillating apparatus of a 3-axis orthogonal type.

As shown in FIG. 1, a laser oscillating apparatus 1 is constructed so as to enclose a laser resonator in a gas-tight laser housing 3. At the right end of the cylindrical laser housing, there are connected electrical source cables 5, gas injecting tube 7 for injecting mixed gas such as of $CO_2$, He, Ne, and cooling water piping 9 for cooling the inside of the housing. At the left end of the laser housing 3, there is formed an output window 11 for laser beam LB.

As shown in FIG. 2, at the upper portion of the inside of the housing 3, there is provided an upper and lower pair of discharge electrodes 15U, 15D along the longitudinal direction of the housing 3 at a predetermined distance apart, each said discharge having a large number of pin-shaped electrodes 13. Below the discharge electrodes 15U, 15D, a blower 17 is provided which rotates in a counter-clockwise direction as seen in FIG. 2 and which produces a gas flow A in a counter-clockwise direction in the housing 3.

Heat exchangers 19, 21 are provided between the blower 17 and a lasing space B formed by the above described upper and lower pair of discharge electrodes 15U, 15D. Flow directing baffles FC1, FC2 and FC3 are provided between blower 17, heat exchangers 19, 21 and discharge electrodes 15U, 15D for smoothing the gas flow A. A pair of folding mirrors M are disposed oppositely at the inside of the both ends of the cylindrical housing 3.

In an arrangement of a laser oscillating apparatus 1 as described above, an alternating current source is provided to the upper and lower pair of discharge electrodes 15U, 15D and a glow discharge is produced at the lasing space B. The $CO_2$ molecules flowing into the lasing space are effectively stimulated by the synergistic effect of other mixed gas, thus causing a laser beam with a wave length of 10.6 micro-meters between the two pieces of the folding mirrors, and the laser beam LB is output from the output window 11.

Figure 3:
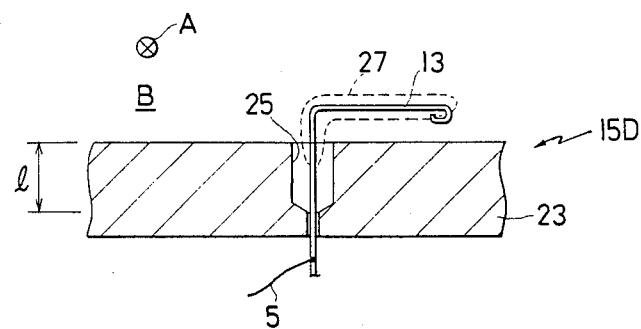
FIG. 3 is a cross-sectional view of a part of an essential portion of a electric discharge electrode of one embodiment according to this invention.
Figure 4:
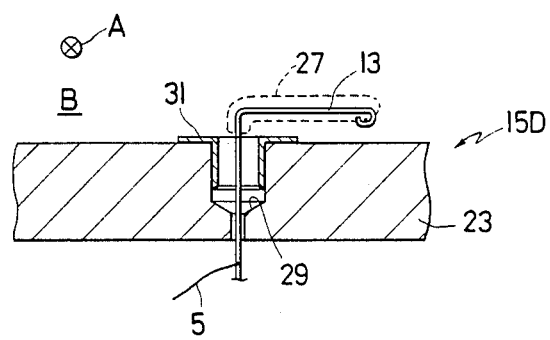
FIG. 4 is a cross-sectional view of a part of an essential portion of another embodiment according to this invention.

FIGS. 3 and 4 relate to embodiments of this invention, and show an enlarged detail of the pin-shaped electrode 13 which is taken as a cross section of FIG. 2 seen from the right side. (since the configuration of the pin-shaped electrode is on the discharge, only the configuration of pin-shaped electrode 13 on the electrode 15D will be explained as an example).

In the embodiment shown in FIG. 3, a cavity 25 is provided on a ceramic made insulating base plate 23. The pin-shaped electrode 13 is embedded in this cavity 25.

The front end of the pin-shaped electrode 13 is curled to an approximately circular shape to remove the pointed portion. The rear end of the pin-shaped electrode 13 penetrates the insulating base plate 23 and is connected to the previously described source cable 5 through the ballast capacitor.

The diameter of the cavity 25 of the insulating base plate 23 is sufficient so that the tail of a negative glow 27 does not touch the peripheral edge of the cavity 25. Also, the depth of the cavity 25 should have a dimension so that the tail of the negative glow does not reach the base of the cavity.

In the arrangement of the discharge electrode 15D as described above, no large field will occur near the bottom of the pin-shaped electrode 13, and thus no electrochemical reaction will occur near the bottom of the pin-shaped electrode 13. As a consequence, the pin-shaped electrode will not be corroded near its bottom.

Further, since the field near the bottom of the pin-shaped electrode is small, no local discharge will occur in this vicinity, and since the front end of the pin-shaped electrode is curled to an approximately circular shape, there will be no local discharge as well. Accordingly, discharge electrode 15D (15U) will be able to accomplish a stable glow discharge as a whole.

Also, in this embodiment, the extension portion (horizontal portion) of the pin-shaped electrode 13 is disposed orthogonal to the gas flow A for the purpose of increasing the cooling effect.

In the embodiment shown in FIG. 4, a cavity 29 similar to the one shown in FIG. 3 is provided on the ceramic made insulating base plate 23, and inside this cavity 29, a flanged metallic annular member 31 is inserted and fitted.

The inside diameter of the annular member 31 is such an extent that it is slightly smaller than the inside diameter of the cavity 25 shown in FIG. 3.

In the discharge electrode 15D shown in FIG. 4, since the annular member 31 maintains an equal electrical potential inside the cavity 29, no large field will occur near the bottom of the pin-shaped electrode 13. The reason for arranging a flange on the annular member 31 is to produce a broad region of equal electrical potential at the top surface of the cavity, and thus to stabilize the glow discharge. The front end of the pin-shaped electrode is curled to an approximately circular shape similar to the previously described embodiment.

Since the arrangement of the discharge electrode described above can more positively reduce the field occurring near the bottom of the pin-shaped electrode, it can more effectively prevent the occurrence of corrosion as well as the arcing discharge near the bottom of the pin-shaped electrode than the one shown in FIG. 3.

Further, in the just described embodiment, there will occur a comparatively large field at the upper end of the outer edge portion of the flange, and it is possible that corrosion may occur at this portion. However, this corrosion takes place comparatively slow, and since an extremely long time is required to corrode the whole portion of the flange, there will be no inadequacies for use.

The two embodiments described are examples of adapting this invention to an alternating current type discharge device.

However, it is obvious that this invention can be also adapted to a direct current type discharge device.

In the case of adapting this invention to a direct current type discharge device, the side of the discharge electrode to which a minus (−) electrical source is to be connected should be constructed as shown in FIGS. 3 and 4. As for the function and effect, they are same to the alternating current type described previously.

What is claimed is:

1. A discharge electrode for producing a glow discharge in a gas discharge device comprising: an insulating base plate having a cavity extending along an axis transverse to the surface of the base plate, the cavity having a peripheral wall circumscribed about a preselected diameter and a base disposed a preselected depth below the surface of the cavity, a pin-shaped electrode having a first portion embedded in the insulating base plate at the base of the cavity and extending within the cavity along the axis thereof and a second portion extending outwardly from the first portion beyond the surface of the base plate, the preselected diameter of the cavity and the preselected depth of the cavity being sized such that the glow discharge produced about the pin-shaped electrode does not reach the peripheral wall or the base of the cavity, and a metallic annular member disposed within the cavity, the annular member having an inside diameter which is larger than the diameter of the pin-shaped electrode and an outside diameter which is slightly smaller than the preselected diameter of the cavity whereby the annular member may be inserted and fitted into the cavity.

2. A discharge electrode as recited in claim 1 wherein the second portion of the pin-shaped electrode extending outwardly of the cavity has a front end which is curled to an approximately circular shape.

* * * * *